(12) United States Patent
Yang

(10) Patent No.: US 8,767,016 B2
(45) Date of Patent: Jul. 1, 2014

(54) VIRTUAL REALITY INTERACTION SYSTEM AND METHOD

(75) Inventor: Shun-Ching Yang, Kaohsiung (TW)

(73) Assignee: Shun-Ching Yang, Kaohsiung (TW)

( * ) Notice: Subject to any disclaimer, the term of this patent is extended or adjusted under 35 U.S.C. 154(b) by 217 days.

(21) Appl. No.: 13/421,152

(22) Filed: Mar. 15, 2012

(65) Prior Publication Data
US 2013/0241920 A1    Sep. 19, 2013

(51) Int. Cl.
*G09G 5/00*     (2006.01)
*G06T 15/00*    (2011.01)

(52) U.S. Cl.
CPC ...................................... *G06T 15/00* (2013.01)
USPC ............................ 345/633; 345/419; 345/630

(58) Field of Classification Search
CPC ........... G01C 21/3638; G01C 21/3682; G01C 21/3685; G01C 21/3694; G09B 29/007; G06T 15/00; G01S 19/42; G01S 5/14; G06F 17/30241
USPC ............. 345/8, 156, 161, 168, 173, 174, 207, 345/419, 633; 446/168; 463/1, 3, 7, 9, 23, 463/25, 31–37, 42, 43; 715/769
See application file for complete search history.

(56) References Cited

U.S. PATENT DOCUMENTS

| | | | |
|---|---|---|---|
| 2001/0026276 A1* | 10/2001 | Sakamoto et al. | 345/473 |
| 2010/0030578 A1* | 2/2010 | Siddique et al. | 705/3 |
| 2011/0107239 A1* | 5/2011 | Adoni et al. | 715/757 |
| 2012/0013609 A1* | 1/2012 | Reponen et al. | 345/419 |
| 2012/0142429 A1* | 6/2012 | Muller | 463/42 |

OTHER PUBLICATIONS

Stephen Shankland, "Google Latitude keeps tabs on friends' locations," published on Feb. 4, 2009, available at http://news.cnet.com/google-latitude-keeps-tabs-on-friends-locations/.*

* cited by examiner

*Primary Examiner* — Kee M Tung
*Assistant Examiner* — Wei Yuan
(74) *Attorney, Agent, or Firm* — WPAT, P.C.; Anthony King

(57) ABSTRACT

A virtual reality interaction system and method have access to data in at least a 3D reality map database and at least a social network website database and allowing a user having logged in the virtual reality interaction system with an electronic device in the user's possession to interact with others and move in a 3D reality scenario. The virtual reality interaction system includes a 3D reality map access unit, a login unit, a social network data access unit, and a computation engine unit. The virtual reality interaction system and method enable the user to perform control operation in the 3D reality scenario according to the user's control command and selectively display the user's social network friends in the 3D reality scenario according to the user's social network relationship data. The user interacts with other online users in the 3D reality diversely and simulates operations in the real world.

13 Claims, 3 Drawing Sheets

VIRTUAL REALITY INTERACTION SYSTEM AND METHOD

FIELD OF THE INVENTION

The present invention relates to interaction systems and methods, and more particularly, to a virtual reality interaction system and method.

BACKGROUND OF THE INVENTION

Due to rapid development of technology and the Internet, the tie between the Internet and electronic devices has been closer than ever before, and plenty of information is available on the Internet.

Online games that feature a virtual environment are beneficiaries of the Internet boom. Users interact with each other and have fun through a computer on which the virtual environment is presented. Recently, social network websites are all the rage, thanks to the Internet.

Nonetheless, online virtual environments are neither true nor pertinent to reality. Interaction between social network website users is restricted to words and pictures and thus has room for improvement in terms of functionality and ease of use.

SUMMARY OF THE INVENTION

It is an objective of the present invention to provide a virtual reality interaction system and method applicable to the real world.

Another objective of the present invention is to enable diverse interaction between online users.

Yet another objective of the present invention is to provide a virtual reality interaction system and method characterized by use of social network information.

In order to achieve the above and other objectives, the present invention provides a virtual reality interaction system that has access to data in at least a 3D reality map database and at least a social network website database and allows a user having logged in the virtual reality interaction system with an electronic device in the user's possession to interact with others and move in a 3D reality scenario. The virtual reality interaction system comprises: a 3D reality map access unit connected to the at least a 3D reality map database for retrieving 3D reality map data therefrom; a login unit connectable to the electronic device for allowing the user to log in the virtual reality interaction system, determining the user's initial coordinate address, and receiving a control command from the user; a social network data access unit connected to the login unit for retrieving social network relationship data from at least a social network website database associated with the user; and a computation engine unit connected to the 3D reality map access unit, the login unit, and the social network data access unit for creating the 3D reality scenario, displaying the user in the 3D reality scenario in accordance with the initial coordinate address, performing control operation in the 3D reality scenario according to the control command, and displaying social network friends of the user selectively in the 3D reality scenario according to the user's social network relationship data, wherein the login unit sends data related to a result of the aforesaid computation to the electronic device.

In an embodiment, the login unit sets the initial coordinate address to the positioning coordinate transmitted by the electronic device.

In an embodiment, the login unit sets the initial coordinate address to a preset coordinate address when the electronic device does not transmit the positioning coordinates.

In an embodiment, the virtual reality interaction system further comprises a virtual object generating unit connected to the computation engine unit for providing a virtual object in the 3D reality scenario in a manner that the virtual object therein can be watched or accessed.

In an embodiment, the virtual reality interaction system further comprises a user account database connected to the login unit for recording user's personalized data and the virtual object in the user's possession.

The present invention further provides a virtual reality interaction method that allows a user having logged in the virtual reality interaction system with an electronic device in the user's possession to interact with others and move in a 3D reality scenario and displays 3D reality scenario data on the electronic device. The virtual reality interaction method comprises the steps of: retrieving 3D reality map data from at least an external 3D reality map database to create the 3D reality scenario; generating an initial coordinate address in response to the user's login; retrieving social network relationship data from at least a social network website database associated with the user; and displaying the user and selectively displaying the user's social network friends in the 3D reality scenario in accordance with the initial coordinate address and the user's social network relationship data and performing control operation in the 3D reality scenario in accordance with the user's control command.

In an embodiment, the step of generating the initial coordinate address further comprises the sub-steps of: determining whether the user's login information includes a positioning coordinate information; setting the initial coordinate address to the positioning coordinate information when the determination is affirmative; and setting the initial coordinate address to a preset coordinate address when the determination is negative.

In an embodiment, the virtual reality interaction method further comprises the step of providing at least a virtual object in the 3D reality scenario such that the virtual object therein can be watched or accessed, wherein the at least a virtual object comprises a billboard.

In another embodiment, the virtual reality interaction method further comprises the step of performing control operations in the 3D reality scenario under the control commands of teaming, tracking, and trading, so as to provide diverse channels of interaction.

Accordingly, the present invention provides a virtual reality interaction system and method which are advantageously characterized by integration of a social network, an online multi-user role-playing system, and a 3D real world model so as to allow online users to interact with each other diversely and enable online guided touring (such as teaming plus tracking) and other related functions.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Figure 1:
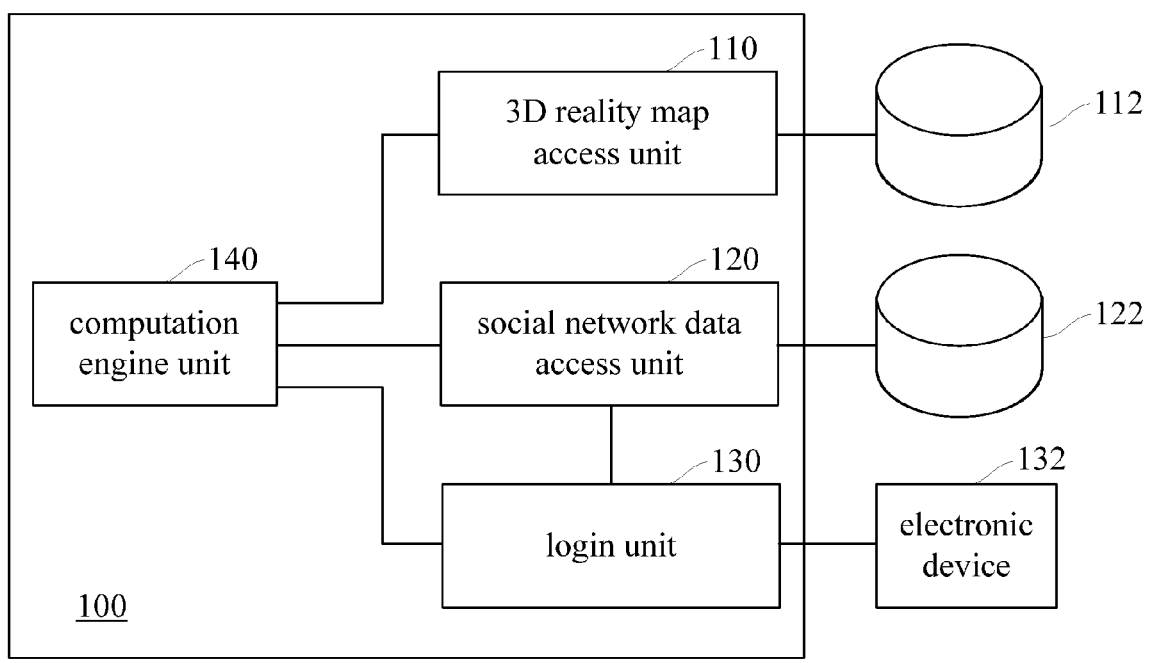
FIG. 1 is a block diagram of a virtual reality interaction system according to an embodiment of the present invention.

Referring to FIG. 1, there is shown a block diagram of a virtual reality interaction system 100 according to an embodiment of the present invention. As shown in FIG. 1, the virtual reality interaction system 100 comprises a 3D reality map access unit 110, a social network data access unit 120, a login unit 130, and a computation engine unit 140. The virtual reality interaction system 100 can access data in at least a 3D reality map database 112 and at least a social network website database 122, such that a user can interact with others and move in a manner that the user's interaction with others and the user's movement take place in a 3D reality scenario, by connecting the virtual reality interaction system 100 to an electronic device 132 in the user's possession.

Although only one said 3D reality map database 112 and only one said social network website database 122 are shown in FIG. 1, their quantity is subject to changes as needed. For example, if the user "enters" a building, the 3D reality map access unit 110 will retrieve data from a database having 3D reality data pertaining to the building. For example, if the user visits multiple social network websites, such as Facebook, Google+, and Twitter, the social network data access unit 120 will retrieve, as configured (for example, imported as decided by the user), from the at least asocial network website database 122 data pertaining to a social networking relationship.

The 3D reality map access unit 110 is connected to the at least a 3D reality map database 112 for retrieving 3D reality map data therefrom.

The login unit 130 is connected to the electronic device 132, such that the login unit 130 functions as a connection interface whereby the user logs in the virtual reality interaction system 100 with the electronic device 132. The login unit 130 determines the user's initial coordinate address according to the user's login information. For example, if the electronic device 132 sends positioning coordinates (that is, coordinates acquired by the electronic device 132 by means of a GPS) to the login unit 130, the login unit 130 will treat the positioning coordinates as the initial coordinate address. Conversely, if the electronic device 132 does not send the positioning coordinates to the login unit 130, the login unit 130 will treat a preset coordinate address as the initial coordinate address, for example, in entering a lobby. Furthermore, the login unit 130 receives from the user a control command which indicates that the user wants to move around the 3D reality scenario or interact with others.

In an embodiment of the present invention, the electronic device 132 is a cell phone, a tablet computer, a personal digital assistant (PDA) phone, a mobile internet device (MID), an electronic device connectable to the Internet through the login unit 130, a desktop computer, or an object capable of positioning (such as a vehicle equipped with a smart computerized positioning system.)

The social network data access unit 120 is connected to the login unit 130 to access the user's social network relationship data from the at least a social network website database 122 in connection with the user when logged in. The virtual reality interaction system 100 accesses the user's social network relationship data as authorized by the user, and thus the user can have social network relationships with others and waive the user's privacy right at different levels with regard to other users in different social network relationships or different groups. For example, if user A blocks user B in a social network website, user B will be unable to see user A in the virtual reality interaction system 100 or interact with user A.

The computation engine unit 140 is connected to the 3D reality map access unit 110, the login unit 130, and the social network data access unit 120 for creating the 3D reality scenario, displaying the user in the 3D reality scenario in accordance with the initial coordinate address, performing control operation in the 3D reality scenario according to the control command, and displaying social network friends of the user selectively in the 3D reality scenario according to the user's social network relationship data. The login unit 130 sends data related to the result of the aforesaid computation to the electronic device 132.

Figure 2:
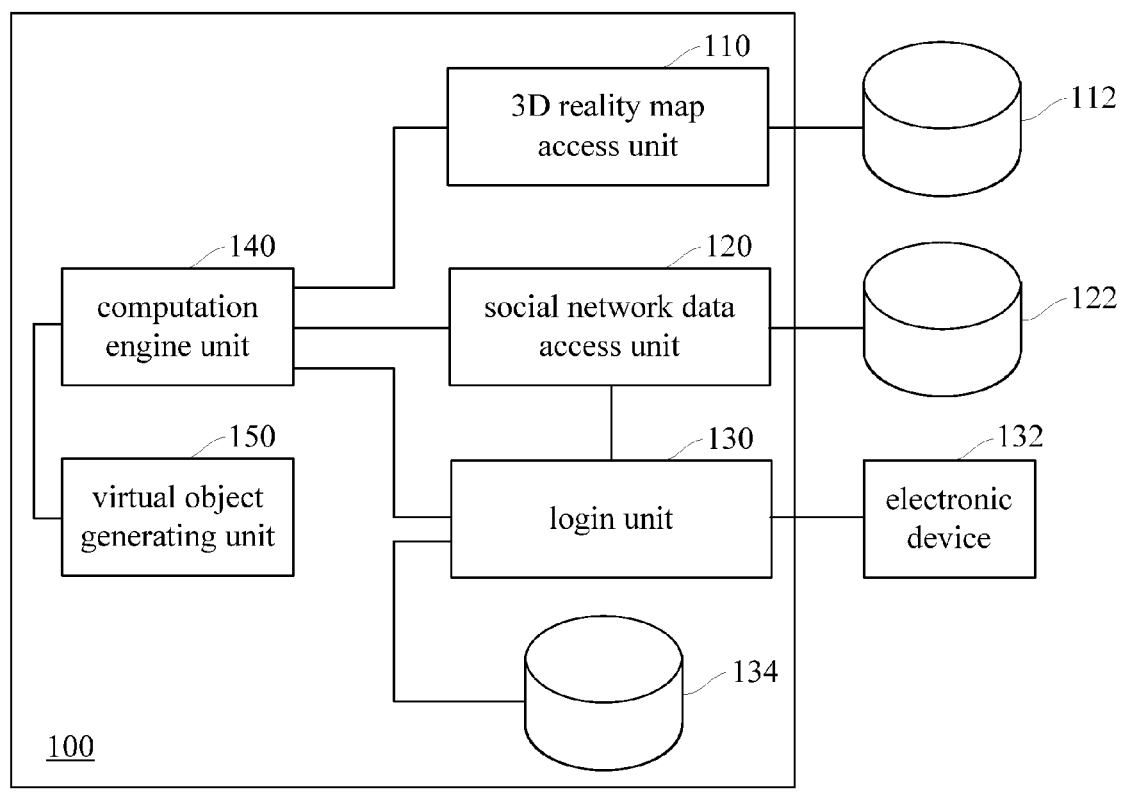
FIG. 2 is a block diagram of the virtual reality interaction system according to another embodiment of the present invention.

Referring to FIG. 2, there is shown a block diagram of the virtual reality interaction system 100 according to another embodiment of the present invention. As shown in FIG. 2, the virtual reality interaction system 100 further comprises a virtual object generating unit 150 and a user account database 134.

The virtual object generating unit 150 is connected to the computation engine unit 140 and adapted to provide at least a virtual object in the 3D reality scenario and the virtual object therein can be watched or accessed. Examples of the virtual object include a virtual road sign, a virtual building, a virtual billboard, and a virtual object.

The user account database 134 is connected to the login unit 130 and adapted to record the user's personalized data and a virtual object in the user's possession.

Accordingly, the computation engine unit 140 effectuates the operations performed by the user toward others in the 3D reality scenario under such control commands as teaming, tracking, or trading.

The computation engine unit 140 displays other users in the 3D reality scenario, enables the user to team up with at least one of the other users in accordance with the control command pertaining to the user's teaming operation, and stores a resultant team member list in the user account database 134.

The computation engine unit 140 creates a tracking relationship between the user and a leader in accordance with the control command pertaining to the user's tracking operation, wherein the leader is one of the team members. The computation engine unit 140 produces computation result data in accordance with the leader's trail in the 3D reality scenario; meanwhile, the virtual reality interaction system 100 ignores the user's current position-related information and sends the leader's current scenario-related data in the 3D reality scenario directly to the electronic device 132 for display. Alternatively, the virtual reality interaction system 100 works like a typical navigation device, that is, guiding the user to move in a real environment in accordance with the leader's trail or the user's current positioning coordinates.

The computation engine unit 140 enables the user to trade a virtual object in the user's possession with one of the other users in accordance with the control command pertaining to the user's trading operation.

Figure 3:
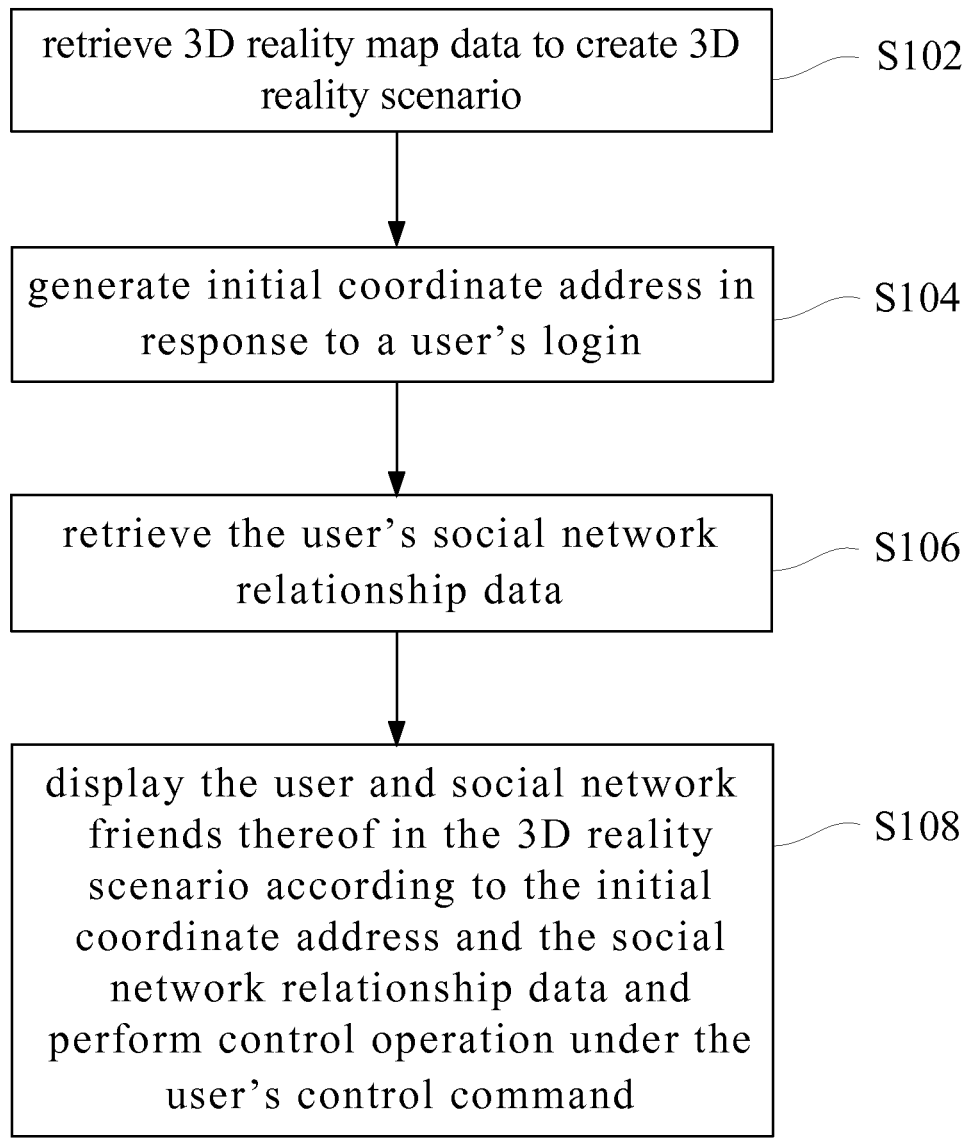
FIG. 3 is a flow chart of a virtual reality interaction method according to an embodiment of the present invention.

Referring to FIG. 3, there is shown a flow chart of a virtual reality interaction method according to an embodiment of the present invention. The method comprises the steps of:

S102: retrieving 3D reality map data from at least an external 3D reality map database to create the 3D reality scenario;

S104: generating an initial coordinate address in response to the user's login;

S106: retrieving social network relationship data from at least a social network website database associated with the user; and S108: displaying the user and selectively displaying the user's social network friends in the 3D reality scenario in accordance with the initial coordinate address and the user's social network relationship data and performing control operation in the 3D reality scenario in accordance with the user's control command.

In another embodiment, step S104 further comprises the sub-steps of: determining whether the user's login information includes a positioning coordinate information; setting the initial coordinate address to the positioning coordinate information when the determination is affirmative; and setting the initial coordinate address to a preset coordinate address when the determination is negative.

The virtual object is a virtual object in the 3D reality scenario and the virtual object therein can be watched or accessed. Alternatively, the virtual object is a billboard.

The operation performed to execute the control commands of teaming, tracking, and trading in the 3D reality scenario between the user and others includes: a control operation step of teaming, a control operation step of tracking, and/or a control operation step of trading.

The control operation step of teaming further comprises the sub-steps of: displaying other users in the 3D reality scenario; and teaming up the user and at least one of the other users under a teaming control command.

The control operation step of tracking further comprises the sub-steps of: creating a tracking relationship between the user and one of the other members of the team under a tracking control command so as to create a leader; and sending 3D reality scenario-related data to the user's electronic device in accordance with the leader's trail in the 3D reality scenario so as for the leader's trail to be displayed on the electronic device.

The control operation step of trading further comprises the sub-step of trading by the user a virtual object in the user's possession with one of the other users.

In conclusion, the present invention provides a virtual reality interaction system and method which are advantageously characterized by integration of a social network, an online multi-user role-playing system, and a 3D real world model so as to allow online users to interact with each other by means of the virtual reality interaction system, provide high-fidelity simulation of 3D reality, and integrate various social network information.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A virtual reality interaction system, having access to data in at least a 3D reality map database and at least a social network website database and allowing a user having logged in the virtual reality interaction system with an electronic device in the user's possession to interact with others and move in a 3D reality scenario, the virtual reality interaction system comprising:
a 3D reality map access unit connected to the at least a 3D reality map database for retrieving 3D reality map data therefrom;
a login unit connectable to the electronic device for allowing the user to log in the virtual reality interaction system, determining the user's initial coordinate address, and receiving a control command from the user;
a social network data access unit connected to the login unit for retrieving social network relationship data from at least a social network website database associated with the user; and
a computation engine unit connected to the 3D reality map access unit, the login unit, and the social network data access unit for creating the 3D reality scenario, displaying the user in the 3D reality scenario in accordance with the initial coordinate address, performing control operation in the 3D reality scenario according to the control command, and displaying social network friends of the user selectively in the 3D reality scenario according to the user's social network relationship data,
wherein the login unit sets the initial coordinate address to a preset coordinate address when the electronic device does not transmit the positioning coordinates.

2. The system of claim 1, wherein the login unit sets the initial coordinate address to the positioning coordinate transmitted by the electronic device.

3. The system of claim 1, further comprising a virtual object generating unit connected to the computation engine unit for providing a virtual object in the 3D reality scenario in a manner that the virtual object therein can be watched or accessed.

4. The system of claim 3, further comprising a user account database connected to the login unit for recording user's personalized data and the virtual object in the user's possession.

5. The system of claim 4, wherein the computation engine unit displays other users in the 3D reality scenario, enables the user to team up with at least one of the other users in accordance with the control command pertaining to the user's teaming operation, and stores a resultant team member list in the user account database.

6. The system of claim 5, wherein the computation engine unit creates a tracking relationship between the user and a leader in accordance with the control command pertaining to the user's tracking operation, the leader being on the team member list, and the computation engine unit produces computation result data in accordance with the leader's trail in the 3D reality scenario.

7. The system of claim 5, wherein the computation engine unit enables the user to trade a virtual object in the user's possession with one of the other users in accordance with the control command pertaining to the user's trading operation.

8. A virtual reality interaction method, allowing a user having logged in the virtual reality interaction system of claim 1 with an electronic device in the user's possession to interact with others and move in a 3D reality scenario and displaying 3D reality scenario data on the electronic device, the virtual reality interaction method comprising the steps of: retrieving 3D reality map data from at least an external 3D reality map database to create the 3D reality scenario; generating an initial coordinate address in response to the user's login; retrieving social network relationship data from at least a social network website database associated with the user; and displaying the user and selectively displaying the user's social network friends in the 3D reality scenario in accordance with the initial coordinate address and the user's social network relationship data and performing control operation in the 3D reality scenario in accordance with the user's control command,
wherein the step of generating the initial coordinate address further comprises the sub-steps of:

determining whether the user's login information includes a positioning coordinate information;

setting the initial coordinate address to the positioning coordinate information when the determination is affirmative; and setting the initial coordinate address to a preset coordinate address when the determination is negative.

9. The method of claim 8, further comprising the step of providing at least a virtual object in the 3D reality scenario such that the virtual object therein can be watched or accessed.

10. The method of claim 9, wherein the at least a virtual object comprises a billboard.

11. The method of claim 9, wherein the control operation step of teaming further comprises the sub-steps of: displaying other users in the 3D reality scenario; and teaming up the user and at least one of the other users under a teaming control command.

12. The method of claim 11, wherein the control operation step of tracking further comprises the sub-steps of: creating a tracking relationship between the user and one of the other members of the team under a tracking control command so as to create a leader; and sending 3D reality scenario-related data to the user's electronic device in accordance with the leader's trail in the 3D reality scenario.

13. The method of claim 11, wherein the control operation step of trading further comprises the sub-step of trading by the user a virtual object in the user's possession with one of the other users.

\* \* \* \* \*